— —
United States Patent [19]

Mooney

[11] Patent Number: 4,581,991
[45] Date of Patent: Apr. 15, 1986

[54] PIE FILLING DEVICE

[76] Inventor: Clarence I. Mooney, 2942 Grayson Way, Rancho Cordova, Calif. 95670

[21] Appl. No.: 742,807

[22] Filed: Jun. 10, 1985

[51] Int. Cl.[4] ............................................. A47J 43/04
[52] U.S. Cl. .................................... 99/646 R; 99/352; 99/450.3; 417/234; 426/283; 426/523
[58] Field of Search ................. 99/352, 450.3, 646 R; 417/234; 426/282, 283, 523

[56] References Cited

U.S. PATENT DOCUMENTS

| | | | |
|---|---|---|---|
| 2,719,496 | 10/1955 | Arnieri | 99/450.3 X |
| 3,305,137 | 2/1967 | Gauthier | 417/234 X |
| 3,906,850 | 9/1975 | Papai | 99/352 X |
| 4,004,862 | 1/1977 | Hill | 417/234 |
| 4,070,135 | 1/1978 | Eller | 417/234 |

FOREIGN PATENT DOCUMENTS 722883  2/1955  United Kingdom ................. 99/352

*Primary Examiner*—Billy J. Wilhite
*Attorney, Agent, or Firm*—Mark C. Jacobs

[57] ABSTRACT

A pumping apparatus mountable on a mobile cart or shelf for transferring a liquid or slurry pie filling such as is used for pumpkin and custard pie to pre-formed pie crusts within the confines of an oven. The device is used in small 1–3 man bakery in the manufacture of pumpkin or custard pie.

The device features a housing having a pump and motor and an inlet pipe to bring the filling to the pump from which it is transferred to other locations within an oven by an outlet hose connected to a loading arm. The flow of filling is controlled by the operator via a switch mounted on the arm.

14 Claims, 6 Drawing Figures

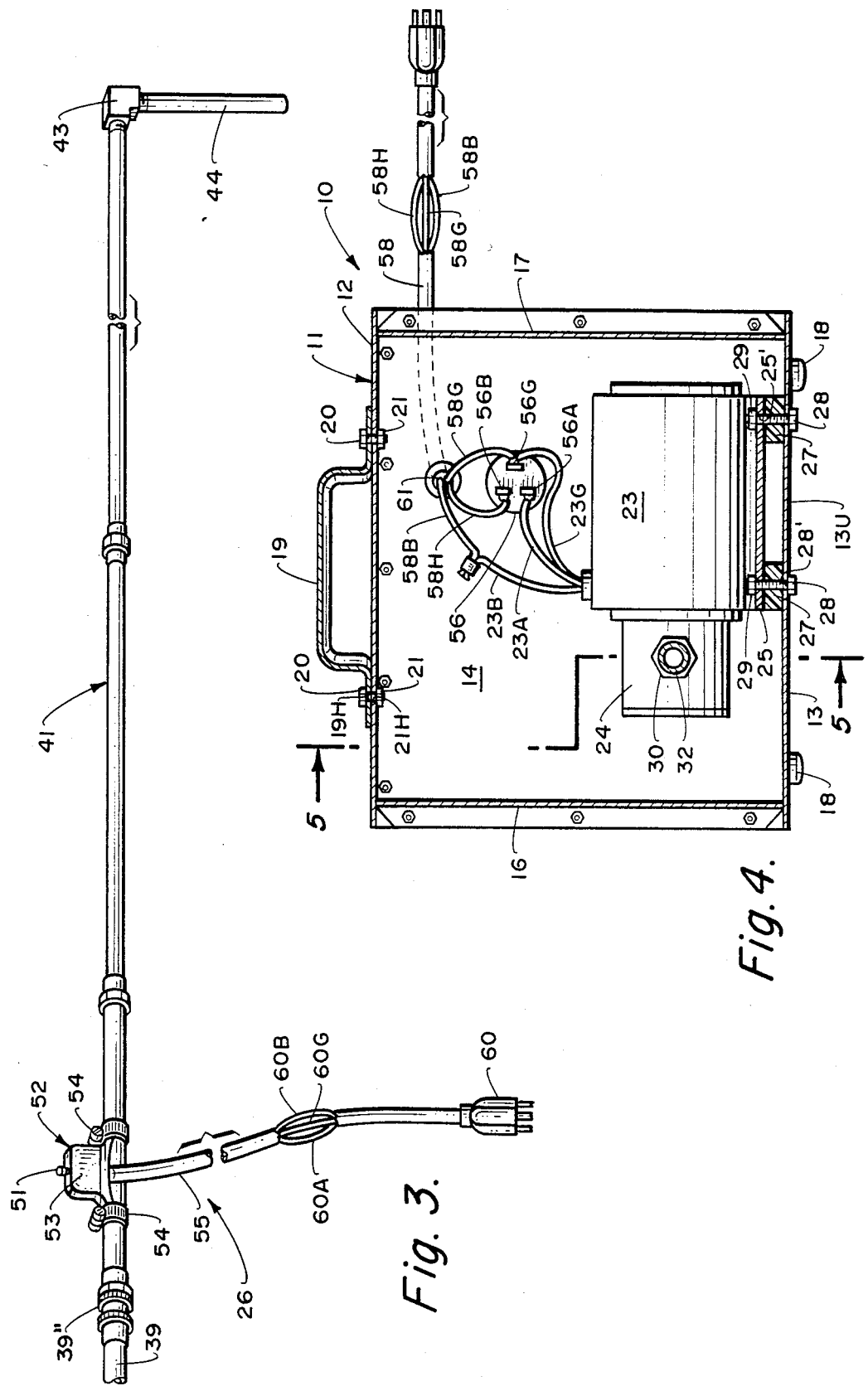

PIE FILLING DEVICE

FIELD OF INVENTION

This device pertains to a pumping apparatus for the filling of pie shells with a fluid filling within a hot oven.

BACKGROUND OF THE INVENTION

It is common practice today to make pumpkin custard and other similar pies by filling a pre-formed shell within an aluminum pie plate during the baking cycle. This takes place at about 400° F. The lower crusts or shells as they are known to the art are placed in the oven which is often multi tiered, and which can hold about two dozen pies on each shelf. This is done to avoid possible spillage and lost time in cleaning up during the transfer from a fill area outside the area to the oven interior.

Today, a long handled paddle with a ladel on it is used to fill the pie shells within the oven. It takes about 1 and ½ hours to fill a typical commercial Baxter 7 oven when such is filled with pumpkin pie shells.

There is a need therefore for a device to hasten the loading or transfer of pie filling within pie shells in an oven.

Such a device must be easy to use and readily portable.

It is an object therefore to provide a portable pumping means for transferring pumpkin, custard and similar pie filling to a load of shells inside an oven.

One object therefore is to provide an easy to use pie slurry transferring device.

Another object is to provide a portable pump means for the transfer of pie filling.

Yet another object is to provide a pie filling transfer means useable at the oven site.

These and other objects of the invention will in part be obvious and will in part appear hereinafter.

The invention accordingly comprises the apparatus possessing the construction, combination of elements and any of parts which are exemplified in the following detailed disclosure and the scope of the application of which will be indicated in the claims.

For a fuller understanding of the nature and objects of the invention, reference should be had to the following detailed description taken in connection with the accompanying drawings.

BRIEF DESCRIPTION OF THE DRAWINGS

FIG. 3 is a perspective view of a portion of this invention;

FIG. 4 is a vertical view along the line 4—4 of FIG. 1;

SUMMARY OF THE INVENTION

A fluid transfer means for transferring a liquid or slurry pie filling to pie shells within a pie oven. The apparatus includes a pump and motor within a housing. To the inlet side of the pump is attached a weighted hose for retrieving fluid or slurry for a re. On the outlet side is a fluid delivery system which includes a flow control switch. The system includes a nozzle for delivery to the pie shells. An optional spreader may be attached for the filling.

DESCRIPTION OF THE PREFERRED EMBODIMENT

Figure 1:
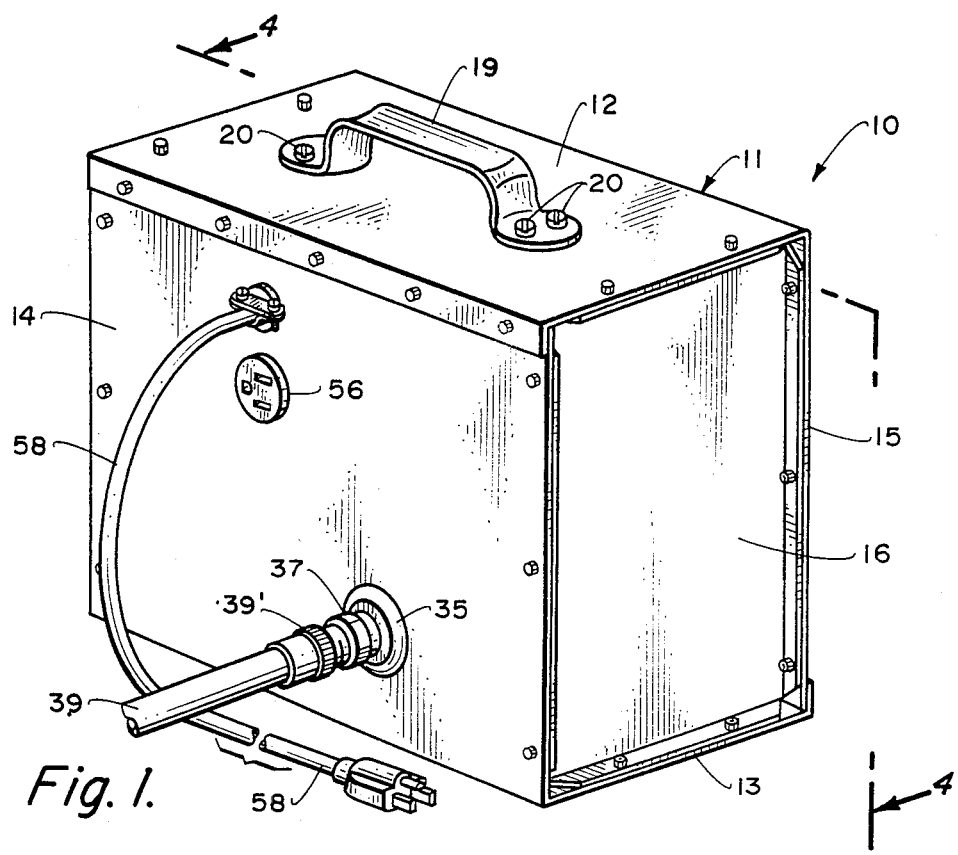
FIG. 1 is a front perspective view of the device of this invention.
Figure 2:
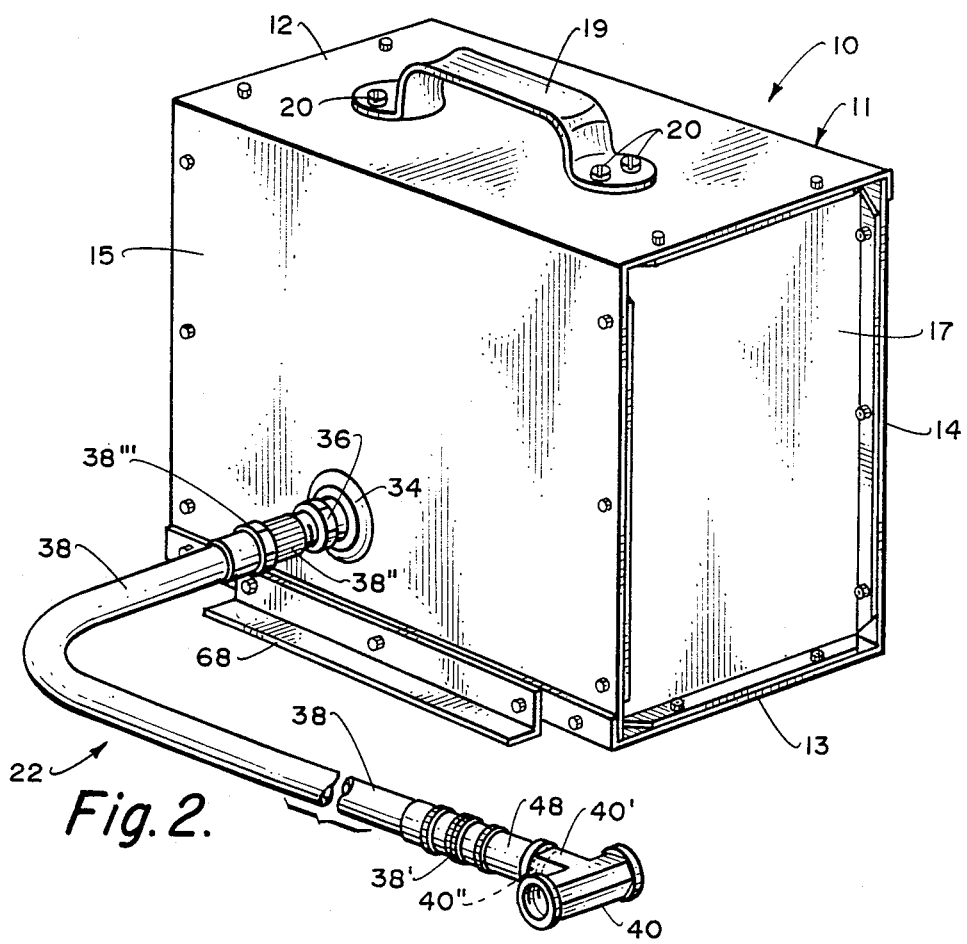
FIG. 2 is a rear perspective view of the fluid transfer means of this invention.

The fluid transfer apparatus of this invention 10 is shown in FIGS. 1 and 2. It features a fluid retrieval system 22 and a fluid transfer system 26 for delivering filling 50 to pie shells within an oven (not shown)

Apparatus 10 includes a housing 11 here shown to be generally rectangular and having spaced top and bottom wells 12, 13 spaced front, rear, left side and right side walls 14, 15, 16 and 17 normal to said to top and bottom wells. Feet 18 may be secured as by adhesive or the use of self tipping screws not shown, into the underside 13U of the bottom wall 13.

Within the housing 11 as seen in FIG. 4 there is mounted a motor 23 and a pump 24. Motor 23 includes a pair of mounting flanges or plates 25 these flanges 25 extend outwardly from the bottom of the motor 23 and are used to stationarily mount the motor 23. This is accomplished by placing the flanges 25 on hard rubber shock absorbing annular blocks 27. The blocks, 2 of the 4 of which are seen in FIGS. 4 and 5 are secured in place by a threaded bolt 28 passing through a hold 28' in the bottom wall 13, through the central bore, not seen of said annular blocks, and through an aligned bore 25' in said flange, a nut 29 is placed on the threaded end of said bolt 28.

As shown in FIG. 4, motor 23 is conventionally mounted to and electrically connected to pump 24, and the pump 24 is mounted directly to said motor as is known in the art. Such pump and motor combinations are generally available in the market and are used for fluid transfer systems such as for filtration systems of swimming pools among other things. Further details about the fluid retrieval system 22 and the fluid delivery system, 26 will be discussed below.

On the top wall 12 of the housing 11 there is shown conceptionally mounted a handle 19. The mounting means includes a pair of threaded bolts that pass through bores 19H into alignment with holes 21H in top wall 12. The threaded bolt 20 may be secured in place by a nut 21 in like manner. Self tapping screw may be substituted for the threaded bolt 20.

Figure 5:
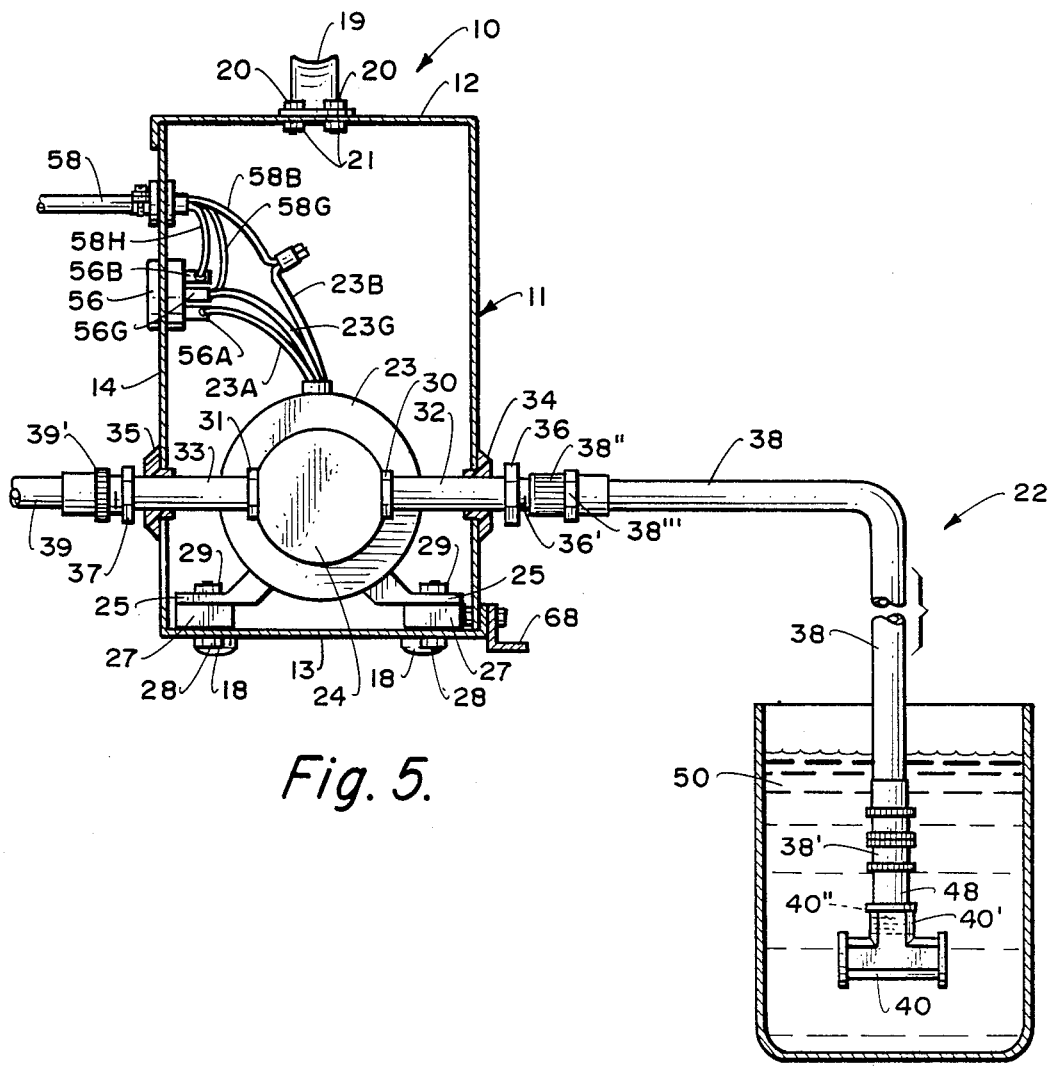
FIG. 5 is a vertical view taken along the line 5—5 of FIG. 4.

FIGS. 4 and 5 are sectional views showing the interior of the housing 11. The attachment of the pump and motor has been discussed previously. As can be seen FIG. 4 threaded inlet connector 30 leads directly into the interior of the pump 24. To this inlet connection is secured the fluid retrieval system 22 of this invention. Fluid retrieval system 22 comprises a weighted threaded tee 40 of brass or some other heavy food grade metal, open on two ends and adapted to receive a fluid pie filling. Tee 40 includes a threaded end 40' having female threads, 40" and adapted to received a short male coupling 48 which is male threaded on both ends. One end of this coupling 48 engages the weighted fluid receiving head, which as shown, is in the shape of a tee 40, preferably made of brass. The other end engages hose 38 a female threaded coupling 38' on hose 38. While shown as a single length hose, obviously as in garden hoses, two smaller lengths can be threadedly joined together.

An inlet port usually of brass 36 extends from wall 15 for connection to hose 38. Inlet 36 which is tubular contains standard hose made threads 36' as is seen in FIG. 1. An annular seal 34 helps retain inlet 36 in place. A base 38" matingly engages inlet port 36 via coupling 38''' as seen best in FIG. 2.

Inlet port 36 is threadingly engages preferably to connector tube 32 which in turn is threadingly engaged to the inlet side 30 of the pump 24. Pump 24 as is well known in the art is operated by electric motor 23 which motor includes cord 58 for attachment to an AC source.

Extending from pump 24 is the outlet side 31 which in turn is preferably threadingly engaged to connector tube 33. This connector tube 33 is male threaded at both ends connects on the side opposite the outlet side 31 to outlet port 37. Outlet port 37 is retained in place by rubber annular seal 35 as seen best in FIG. 1.

An outlet hose 39 is coupled via hose coupling 39' to the outlet port 37.

This hose 39 like its counterpart on the inlet side 38, is a flexible food grade, optionally reinforced plastic or rubber hose, bores of this nature are readily available in the marketplace with diameters of ½" to 1". Hose 39 couples via a second coupling 39" to tubular arm 41. Arm 41 is made of a rigid plastic such as PVC tube or stainless steel tubing or any other food grade material. Arm 41 may extend anywhere form 1' to 4' long as either one piece or as an assemblage of shorter lengths. Arm 41 which is male threaded on its proximal end may also be so threaded on both ends, in order that it may be connected at its distal end to a double female threaded elbow 43. Dependent upon the size of the elbow, there may be connected in fluid communication with the elbow 43 by male threads, a spout 44. Or the elbow can serve double duty as the spout as well.

Typically arm 41 is of the same diameter as the inlet and outlet hoses. The same is true of the elbow and spout, 43 & 44 respectively.

While the arm, elbow and spout have been discussed as being threadable to each other, it is also within the scope of the application to provide adhesible components secureable to each other by food grade glue.

Mounted preferably at a convenient location on arm 41 is a switch control 52. This control includes switch 53 and clamps 54 eg if the hose clamp type to secure said switch 53 to arm 41. Electric control line 55 is electrically connected removedly as is know to the art from switch 53 to an electrical outlet 56 by a plug 60 seen in FIG. 3. When plug 60 is engaged in outlet 56, the switch 53 can be used to control the motor 23 as will be described below. The switch can also be mounted on the housing 11 but such is less convenient.

Clamp plate 68 is an elongated L shaped plate conventionally secured to wall 15. A single or pair of C-clamps can be tighten against this plate and a table surface to secure the device 10 at a location desired for its usage. Though not actually necessary, the clamp(s) prevent vibratory movement as is common with pumping devices, thus retaining the apparatus in a fixed position.

It is seen that line cord 58 includes three wires one of which is the hot wire, designated 58H. This last is electrically connected to outlet 56 at post 56B, while the ground wire 58G is connected to terminal 56G on outlet 56. Wire 60B which terminates in plug 60 is electrically connected to one pole of switch 53. The other pole of switch 53 is connected to wire 60A which terminates in plug 60. The ground lug of the switch 53 is electrically connected to the ground wire 60G which also terminates in plug 60. The line cord may extend through an opening in the bottom wall or through an opening such as 61 in one of the vertical walls.

Wiring from the motor 23, which is typically a 7 amp. single phase motor, includes wire 23A that connects to post 56A, the ground wire 23G that is also connected to terminal 56G, and the return wire 23B that connects directly to wire 58B of the line cord.

When line cord 58 is attached to a source of power, not seen, and plug 60 is engaged into outlet 56, electricity will flow through hot wire 58H, through wire 60B to switch 53, which upon closing of the contact by movement of toggle 51, (which alternatively can be a push button) the circuit is completed, and electricity flows out of the switch through wire 60A to wire 23A thereby actuating the pump and motor for the finite time that the button is pushed or the toggle is toggled. The electricity then flows out wire 23B to wire 58B to the source.

Figure 6:
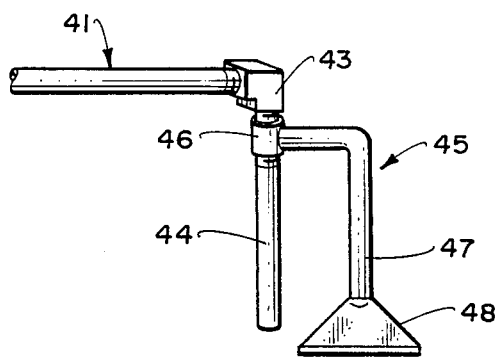
FIG. 6 is a close-up perspective view of an accessory utilizable with this invention.

In FIG. 6 there is shown an accessory for use with the instant device. It is a spreader or smoother for the pie filling once in the pie shell. Spreader 45 comprises a mount portion 46 that totally or partially encircles either arm 41 or the spout 44 for attachment normal thereto. Attached to the mount, also at a right angle is a handle 47 having a blade 48 for smoothing the top of the pie filling mounted thereto and extending forwardly of said nozzle.

The finite time to fill one pie nine inch pie sheel is quite small, when viewed against the statistic that at a typical commercial pie baking facility the instant device can be used to fill about 22 10" deep dish pumpkin pie pastry shells set out on each of 6 shelves of the oven,-it being a common commercial practice to fill the shells in the oven to save time and avoid spillage and cleanup-in about 20 to 30 minutes. Whereas using conventional pouring pitchers mounted on long sticks the time consumed is about 1 hour to 1 hour 30 minutes.

It is seen that I have provided an easily transportable fluid transfer system for filling pie shells, both standard 1' and deep dish, with custard and other fluid or viscous fluids from a vat or container holding same.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A pumping apparatus for transferring fluid pie fillings from a container thereof to pie shells for filling the pie shells during the pie baking process which apparatus comprises:
   a housing having spaced top and bottom walls, opposed front and rear walls and spaced side walls, thereby defining a compartment,
   a fluid pump and motor mounted within said compartment on the bottom wall thereof,
   a pump inlet extending through a first wall of said front, rear and side walls of said compartment to the exterior thereof,
   a pump outlet extending through a second wall of said compartment opposite said first wall to the exterior thereof,
   a fluid retrieval system comprising a flexible inlet hose removably attachable to said inlet, for fluid communication with said pump inlet, said hose having a weighted fluid receiving head at the distal end thereof, for insertion into the container of pie filling, an electrical outlet mounted on the exterior of one wall of said housing, wired to a power line cord and electrically connected to said pump and motor, a fluid delivery system comprising a flexible outlet hose removably attachable to said outlet for fluid communication with said pump outlet at one end thereof, and a rigid delivery arm, secured, optionally removably, at the other end of said outlet hose, and a switch to control the operation of said pump and motor electrically wired to a plug insertable for electrical connection to said outlet.

2. In the apparatus of claim 1 wherein the inlet of the pump is on the rear wall and the outlet is on the front wall of the housing.

3. In the apparatus of claim 1, wherein the fluid receiving head is a brass tee.

4. In the apparatus of claim 1 wherein the arm is threadedly engaged to the outlet hose.

5. In the apparatus of claim 1 wherein the pump control switch is mounted on said arm.

6. In the apparatus of claim 5 wherein the pump control switch is a pushbutton switch.

7. In the apparatus of claim 1 further including a clamp plate for securing the apparatus in a fixed position.

8. The apparatus of claim 1 further including a handle for transporting the apparatus.

9. The apparatus of claim 1 including a spout in fluid communication with said arm mounted normal thereto.

10. In the apparatus of claim 2 wherein the pump control switch is mounted on said arm of the apparatus and the fluid receiving head is a brass tee.

11. In the apparatus of claim 10 further including a spout at right angles to said arm and in fluid communication therewith.

12. The apparatus of claim 1 further including a smoother for the pie filling.

13. The apparatus of claim 9 including a smoother having a blade for smoothing the pie filling mounted upon said spout.

14. In the apparatus of claim 13 wherein the fluid receiving head is a brass tee and the pump control switch is mounted on the arm.

* * * * *